(12) United States Patent
Fujimura et al.

(10) Patent No.: US 11,398,315 B2
(45) Date of Patent: Jul. 26, 2022

(54) FUEL ELEMENT, FUEL ASSEMBLY, AND CORE

(71) Applicant: Hitachi-GE Nuclear Energy, Ltd., Hitachi (JP)

(72) Inventors: Koji Fujimura, Tokyo (JP); Junichi Miwa, Tokyo (JP)

(73) Assignee: Hitachi-GE Nuclear Energy, Ltd., Hitachi (JP)

( * ) Notice: Subject to any disclaimer, the term of this patent is extended or adjusted under 35 U.S.C. 154(b) by 0 days.

(21) Appl. No.: 16/850,829

(22) Filed: Apr. 16, 2020

(65) Prior Publication Data

US 2020/0343006 A1 Oct. 29, 2020

(30) Foreign Application Priority Data

Apr. 26, 2019 (JP) .............................. JP2019-085054

(51) Int. Cl.
*G21C 3/17* (2006.01)
*G21C 1/02* (2006.01)
*G21C 3/04* (2006.01)
*G21C 3/18* (2006.01)
*G21C 5/18* (2006.01)

(52) U.S. Cl.
CPC ............... *G21C 3/17* (2013.01); *G21C 1/024* (2013.01); *G21C 1/028* (2013.01); *G21C 3/042* (2013.01); *G21C 3/18* (2013.01); *G21C 5/18* (2013.01)

(58) Field of Classification Search
CPC . G21C 3/04; G21C 3/16; G21C 3/041; G21C 3/60; G21C 3/18; G21C 3/30; G21C 5/02; G21C 5/18; G21C 5/20
See application file for complete search history.

(56) References Cited

U.S. PATENT DOCUMENTS

| 5,610,956 A | * | 3/1997 | Yokoyama | ............. G21C 1/022 376/172 |
| 2011/0164720 A1 | * | 7/2011 | Takeda | .................... G21C 1/084 376/347 |

FOREIGN PATENT DOCUMENTS

| JP | 2000019280 A | * | 1/2000 |
| JP | 2006226905 A | * | 8/2006 |
| JP | 2011-137735 A | | 7/2011 |
| JP | 2017026372 A | * | 2/2017 |

\* cited by examiner

*Primary Examiner* — Jack W Keith
*Assistant Examiner* — Joshua C Devorkin
(74) *Attorney, Agent, or Firm* — Crowell & Moring LLP

(57) ABSTRACT

The fuel element of the present invention includes a cladding tube and a metal fuel contained in the cladding tube, in which a gas plenum region is formed above the metal fuel and inside the cladding tube and has a small-diameter portion in the gas plenum region. Further, the fuel assembly of the present invention includes the fuel element of the present invention and a wrapper tube surrounding the fuel element, in which a coolant material passage is formed between the fuel element and the fuel element. Further, the core of the present invention includes an inner core fuel region loaded with the fuel assembly according to the present invention, and an outer core fuel region loaded with the fuel assembly of the present invention.

7 Claims, 4 Drawing Sheets

FUEL ELEMENT, FUEL ASSEMBLY, AND CORE

CLAIM OF PRIORITY

The present application claims priority from Japanese Patent application serial no. 2019-85054, filed on Apr. 26, 2019, the content of which is hereby incorporated by reference into this application.

BACKGROUND OF THE INVENTION

1. Field of the Invention

The present invention relates to a fuel element, a fuel assembly, and a core for improving safety in a fast neutron reactor (hereinafter, referred to as "fast reactor") using a metal fuel.

2. Description of Related Art

Japanese Patent Laid-Open No. 2011-137735 is a background art of this technical field. Japanese Patent Laid-Open No. 2011-137735 discloses that the core of a light water reactor is loaded with a plurality of fuel assemblies, the fuel assembly includes a plurality of fuel rods having a lower end supported by a lower tie plate and an upper end supported by an upper tie plate, the fuel rod forms a plenum above a nuclear fuel material-filled region and forms a neutron absorber-filled region above the nuclear fuel material-filled region, and a neutron absorbing member attached to the upper tie plate is disposed between the plenums of adjacent fuel rods above the nuclear fuel material-filled region. Japanese Patent Laid-Open No. 2011-137735 discloses that even if it is assumed that the core is in a state of 100% coolant void, positive reactivity is not injected into the core, the safety margin is further increased without compromising the economics of the light water reactor (see abstract).

Japanese Patent Laid-Open No. 2011-137735 discloses that even if it is assumed that the core of a light water reactor is in a state of 100% coolant void, the positive reactivity is not injected into the core and the safety margin can be increased.

However, Japanese Patent Laid-Open No. 2011-137735 does not disclose a fast reactor. Further, Japanese Patent Laid-Open No. 2011-137735 does not disclose that safety is improved in a fast reactor using a metal fuel (hereinafter, sometimes referred to as a "metal fuel fast reactor").

SUMMARY OF THE INVENTION

Accordingly, the present invention provides a fuel element, a fuel assembly, and a core that reduces void reactivity and improves safety in a fast reactor using a metal fuel.

In order to solve the above problems, the fuel element according to the present invention includes a cladding tube and a metal fuel contained in the cladding tube, a gas plenum region is formed above the metal fuel and inside the cladding tube, and the gas plenum region has a small-diameter portion.

Further, the fuel assembly of the present invention includes the fuel element of the present invention and a wrapper tube surrounding the fuel element, and a coolant material passage is formed between the fuel element and the fuel element.

The core of the present invention includes an inner core fuel region loaded with the fuel assembly of the present invention and an outer core fuel region loaded with the fuel assembly of the present invention.

According to the present invention, it is possible to provide a fuel element, a fuel assembly, and a core that reduces void reactivity and improves safety in a fast reactor using a metal fuel.

Problems, configurations, and effects other than those described above will be clarified by the description of the following examples.

DESCRIPTION OF EMBODIMENTS

Figure 1A:
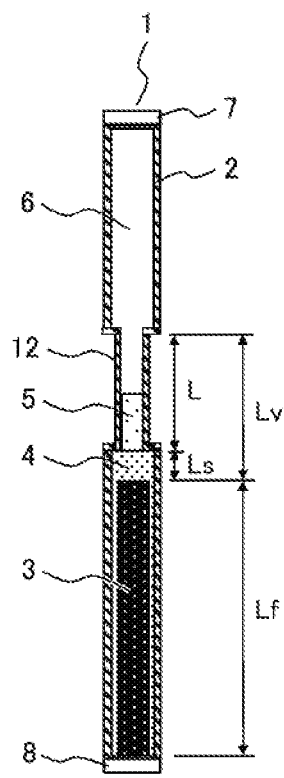
FIG. 1A is an explanatory view illustrating a vertical cross-section of a fuel element of a metal fuel fast reactor of Example 1.

Hereinafter, examples of the present invention will be described with reference to drawings. Substantially the same or similar components are denoted by the same reference numerals, and in cases where the description is duplicated, the description may be omitted.

Example 1

In a fast reactor described in the present example, a reactor core is disposed inside a reactor vessel, and liquid sodium (Na) as a coolant material is filled in the reactor vessel. A fuel assembly loaded in the core includes a plurality of fuel rods (hereafter, may be referred to as "fuel element") enclosing a metal fuel (alloy in which plutonium (Pu) and uranium (U) are the main fuel elements), a wrapper tube surrounding a plurality of bundled fuel elements, an entrance nozzle that is located below these fuel elements to support a neutron shield and form a coolant material inlet, and a coolant material outlet located above these fuel elements.

Further, the core includes a core fuel region having an inner core fuel region loaded with an inner core fuel assembly and an outer core fuel region loaded with an outer core fuel assembly surrounding the inner core fuel region, a blanket fuel region loaded with a fuel assembly surrounding the core fuel region, and a shield region surrounding the blanket region.

For a conventional homogeneous core, the Plutonium enrichment of the outer core fuel assemblies loaded in the outer core fuel region is higher than the Plutonium enrichment of the inner core fuel assemblies loaded in the inner core fuel region. As a result, the radial power distribution of the core is flattened.

A blanket fuel assembly having a plurality of fuel elements is loaded in a blanket fuel region surrounding the core fuel region. Among the neutrons generated by fission reactions that occur inside the fuel assembly loaded in the core fuel region, neutrons leaking from each fuel element of the fuel assembly loaded in the outer core fuel region are absorbed by U-238 inside each fuel element of the blanket fuel assembly loaded in the blanket fuel region. As a result, a fissile fuel nuclide Pu-239 is newly generated inside each fuel element of the blanket fuel assembly.

Further, a control rod is used when the fast reactor is started up, shutdown, and when power is adjusted. The control rod includes a plurality of neutron-absorbing rods in which boron carbide ($B_4C$) pellets are enclosed in a stainless steel cladding tube. These neutron-absorbing rods are housed in a wrapper tube having a regular hexagonal horizontal cross-section, similarly to the inner core fuel assembly and the outer core fuel assembly. The control rods are composed of two independent systems, a primary control rod system (PCR) and a backup control rod system (BCR), and either the primary control rod system or the backup control rod system enables an emergency shutdown of the fast reactor.

The core of a metal-fuel fast reactor has advantages such as a hard neutron spectrum of the core and a higher breeding ratio due to the higher density of heavy metals as compared with the core of an oxide fuel fast reactor.

On the other hand, in the core of a metal fuel fast reactor, if liquid Na, which is a coolant, boils, the void reactivity inserted into the core tends to increase compared to the core of an oxide fuel fast reactor. For example, in an anticipated transient without scram (ATWS), for an unprotected loss of flow (ULOF) in which a pump flow rate is decreased due to a loss of an external power supply, if the void reactivity can be reduced, safety can be further improved.

In a metal fuel fast reactor, the fuel slug (metal fuel) disposed on the fuel element is a single round rod, and in order to absorb the radial expansion associated with the swelling of the metal fuel accompanying irradiation, a relatively large gap is formed between the cladding tube containing the metal fuel and the metal fuel so that the smear density of the metal fuel is 75% TD. Then, this gap is filled with liquid Na as a bonding material. That is, the metal fuel is immersed in the bond Na.

A gas plenum is disposed above the fuel element (above the metal fuel and inside the cladding tube) in order to retain gaseous fission products (FPs) generated by the fission of the metal fuel.

FIG. 1A is an explanatory view illustrating a vertical cross-section of a fuel element of the metal fuel fast reactor according to Example 1.

A fuel element 1 described in the present example includes a U—Pu—Zr (uranium-plutonium-zirconium) metal fuel 3 that is a ternary alloy, a cladding tube 2 containing the metal fuel 3, a bond Na (bond Na4 in the region absorbing fuel swelling and bond Na5 in the region forming a small-diameter portion 12) filled in the cladding tube 2 and immersed in the metal fuel 3, an upper end plug 7, a lower end plug 8, and a gas plenum 6 located above the metal fuel 3 and inside the cladding tube 2. Then, the FP gas generated with the nuclear fission of the metal fuel 3 is retained in the gas plenum 6.

In FIG. 1A, Lf is the length of the metal fuel 3 indicates the vertical direction, Ls indicates the length in the vertical direction of the region that absorbs fuel swelling when the metal fuel 3 expands in the axial direction due to swelling, L indicates the length in the vertical direction of a region (a region where the small-diameter portion 12 is formed) that reduces the diameter (hereinafter, may be referred to as "diameter") of the gas plenum 6, and Lv indicates the length in the vertical direction of a region where the coolant density reactivity coefficient (the density reactivity coefficient obtained by dividing the reactivity of the core by the change rate of the coolant density when the coolant density changes) is positive. When the coolant density decreases at the time of ULOF, negative reactivity is injected in a region where the coolant density reactivity coefficient is positive Lv.

The fuel element 1 described in the present example forms the small-diameter portion 12 (length L in the vertical direction) in the gas plenum (gas plenum region) 6 of the cladding tube 2. That is, the fuel element 1 described in the present example includes the cladding tube 2, and the metal fuel 3 and the bond Na 4 contained in the cladding tube 2, and the gas plenum (gas plenum region) 6 is formed above the metal fuel 3 and inside the cladding tube 2. Then, the small-diameter portion 12 is formed in the gas plenum region.

The small-diameter portion 12 is a portion where the cladding tube 2 is constricted, and a portion where the gas plenum (gas plenum region) 6 is constricted. The constricted portion (small-diameter portion 12) is a portion having a diameter smaller than the diameter of the cladding tube 2 containing the metal fuel 3 and the diameter of the gas plenum 6 (upper portion of the gas plenum 6) in contact with the upper end plug 7. That is, the gas plenum 6 includes the small-diameter portion 12 and a portion having a diameter larger than the small-diameter portion 12.

The small-diameter portion 12 is a portion that increases the area of the coolant material, and is a portion that increases the amount of the coolant material (Na).

As described above, according to the present example, it is possible to provide the fuel element 1 that reduces void reactivity and further improves safety by forming the small-diameter portion 12 in the gas plenum (gas plenum region) 6 of the cladding tube 2. In other words, according to the present example, it is possible to provide the fuel element 1 which is excellent in nuclear characteristics and economy during normal operation, reduces void reactivity, and further improves safety during a ULOF in a metal fuel fast reactor.

Figure 1B:
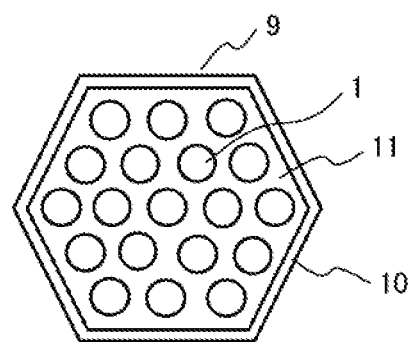
FIG. 1B is an explanatory view illustrating a horizontal cross-section of a fuel assembly of the metal fuel fast reactor of Example 1.

FIG. 1B is an explanatory view illustrating a horizontal cross-section of the fuel assembly of the metal fuel fast reactor of Example 1.

A fuel assembly 9 described in the present example includes fuel elements 1, a wrapper tube 10 surrounding a plurality of bundled fuel elements 1, an entrance nozzle (not illustrated) that supports a neutron shield (not illustrated) located below these fuel elements 1 and forms a coolant material inlet (not illustrated), and a coolant material outlet (not illustrated) located above these fuel elements 1. Further, a coolant material passage 11 is formed between the fuel element 1 and the fuel element 1.

As described above, according to the present example, it is possible to provide the fuel assembly 9 that reduces void reactivity and further improve safety by using the fuel element 1 having the small-diameter portion 12 in the gas plenum (gas plenum region) 6 of the cladding tube 2.

Figure 2:
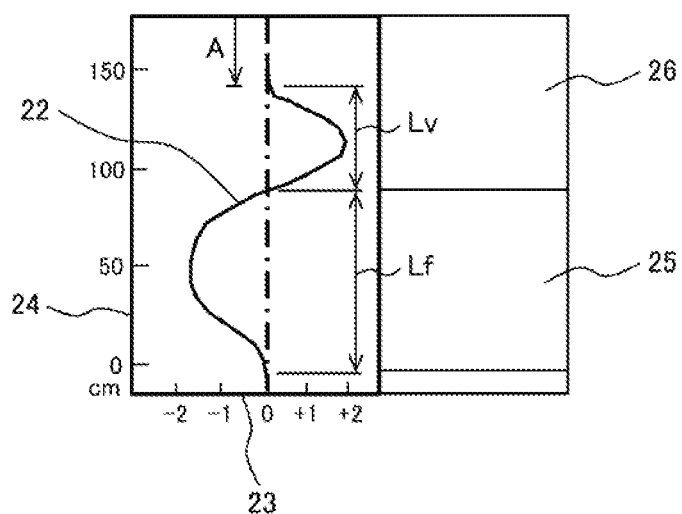
FIG. 2 is an explanatory view illustrating a distribution of a coolant density reactivity coefficient in a height direction of the metal fuel fast reactor of Example 1.

FIG. 2 is an explanatory view illustrating a distribution of a coolant density reactivity coefficient in the height direction (vertical direction) of the metal fuel fast reactor of Example 1.

In FIG. 2, a horizontal axis 23 indicates a density coefficient (coolant density reactivity coefficient) (% Δk/kk'/Δρ/ρ) 22 for the coolant material (Na), and a vertical axis 24 indicates the length in the vertical direction (position in the height direction) from the lower end of the metal fuel 3 to the upper part of the gas plenum 6. Here, ρ is the density of the coolant material (Na).

In the present example, in the metal fuel 3 having an electric output of 300,000 kWe, an average discharge fuel burnup of 100 GWd/t, and an effective fuel length of 100 cm, the length Lf in the vertical direction of the metal fuel 3 is approximately 100 cm, and the length Lv in the vertical direction of the region where the coolant density reactivity coefficient is positive is approximately 40 cm.

For example, in the case of ULOF in the most severe ATWS, as the temperature of the coolant material rises and the density ρ decreases, the coolant density reactivity coefficient (% Δk/kk'/Δρ/ρ) 22 has a negative value because a coolant material reactivity (% Δk/kk') is positive in the metal fuel region (Lf: length of the metal fuel 3 in the vertical direction) 25 where the metal fuel 3 is disposed, and has a positive value because the coolant material reactivity (% Δk/kk') is negative in a partial region (Lv: length in the vertical direction of the region where the coolant density reactivity coefficient is positive) of the gas plenum region 26 where the gas plenum 6 is disposed.

At the time of ULOF, when the temperature of the coolant material increases and the density ρ decreases (Δρ<0), positive reactivity is inserted in the metal fuel region 25, and negative reactivity is inserted in a part of the gas plenum region 26.

Normally, the diameter of the cladding tube 2 in the gas plenum region 26 and the diameter of the cladding tube 2 in the metal fuel region 25 (the diameter of the cladding tube 2 containing the metal fuel 3) are the same for the fuel element 1 of the metal fuel fast reactor. At the time of ULOF, when the temperature of the coolant material rises and the density decreases, negative reactivity is inserted in a part of the gas plenum region 26 because the coolant density reactivity coefficient of a part of the gas plenum region 26 is positive.

Therefore, in the present example, the diameter of the cladding tube 2 in a part of the gas plenum region 26 into which the negative reactivity is inserted is made smaller than the diameter of the cladding tube 2 in the metal fuel region 25, that is, the small-diameter portion 12 (constricted portion) is formed in a partial region of the gas plenum region 26, and the area of the coolant material surrounded by the wrapper tube is increased outside the cladding tube.

Thereby, the negative reactivity inserted at the time of ULOF can be increased to the negative side. Then, the coolant material reactivity or void reactivity of the fuel element 1, the fuel assembly 9, and the core can be reduced, and safety can be improved.

On the other hand, if the diameter of the cladding tube 2 in the gas plenum region 26 is made uniformly smaller than the diameter of the cladding tube 2 in the metal fuel region 25 in order to reduce the void reactivity (when the small-diameter portion 12 (constricted portion) is not formed), a length (A) of the gas plenum region 26 excluding a part of the gas plenum region 26 needs to be considerably long. For example, if the diameter of the cladding tube 2 in a part of the gas plenum region 26 is ½ of the diameter of the cladding tube 2 in the metal fuel region 25 when the small-diameter portion 12 is not formed, the length (A) of the gas plenum region 26 excluding a part of the gas plenum region 26 needs to be quadrupled in order to retain gaseous fission products compared to the case of forming the small-diameter portion 12.

However, in the fuel element 1 described in the present example, the rate of lengthening the length (A) of the gas plenum region 26 excluding a part of the gas plenum region 26 can be reduced, and the compactness can be maintained. As a result, the pressure drop in the core region can be reduced.

In the present example, attention is paid to the fact that the region having the effect of reducing the void reactivity is a partial region (Lv) of the gas plenum region 26. That is, in the present example, the void reactivity is reduced while maintaining compactness by forming the small-diameter portion 12 in the partial region (Lv) of the gas plenum region 26.

The fuel element 1 described in the present example includes the metal fuel 3, the cladding tube 2 containing the metal fuel 3, a bond Na 4 filled in the cladding tube 2 and immersed in the metal fuel 3, and the gas plenum 6 formed above metal fuel 3 (gas plenum region 26), and the small-diameter portion 12 is formed in a part of the gas planar region 26 (a region where the coolant density reactivity coefficient is positive).

As described above, the fuel element 1 described in the present example can reduce the void reactivity while achieving compactness and can further improve safety by forming the small-diameter portion 12 in a part of the gas plenum region 26 of the cladding tube 2.

It is also known that the metal fuel 3 swells due to neutron irradiation, and that the axial swelling rate reaches 8% under the condition of an average discharge fuel burnup of 150 GWd/t. In the cladding tube 2, when the diameter of the upper portion of the cladding tube 2 in the metal fuel region 25 (the lower portion of the cladding tube 2 in the gas plenum region 26) is reduced, the cladding tube 2 may be damaged by the metal fuel 3 expanded by the axial swelling depending on conditions.

Therefore, it is preferable to dispose a region for absorbing the metal fuel 3 expanded by the axial swelling (when the metal fuel 3 expands in the axial direction due to swelling, the region that absorbs the coolant material (the region absorbing the fuel swelling: Ls)) in the cladding tube 2.

In the fuel element 1 described in the present example, in particular, it is preferable to form the small-diameter portion 12 in the region (L) excluding the region (Ls) absorbing fuel swelling from the partial region (Lv) of the gas plenum region 26. Further, in the fuel element 1 described in the present example, it is preferable to form the small-diameter portion 12 in the region (L) excluding the region (Ls) absorbing the fuel swelling from the region (Lv) where the coolant density reactivity coefficient of the gas plenum region 26 is positive.

Here, the length (Ls) in the vertical direction of the region that absorbs the fuel swelling is expressed by Equation (1), where Lf (cm) is the length (effective fuel length) in the vertical direction of the metal fuel 3 and E(GWd/t) is the average discharge fuel burnup.

$$Ls = (0.08/150 \times E) \times Lf \qquad (1)$$

This is based on the finding that the axial swelling rate reaches 8% under the condition of an average discharge fuel burnup of 150 GWd/t.

In the present example, E=100 GWd/t, Lf=100 cm, and Ls=5.3 (rounded) cm. In the present example, the length (Lv) of the region (part of the gas plenum region 26) where the coolant density reactivity coefficient of the gas plenum region 26 is positive is 40 cm, and the length (L) in the vertical direction of the region excluding the length (Ls) in the vertical direction of the region that absorbs the fuel swelling from the region (Lv) (part of the gas plenum region 26) where the coolant density reactivity coefficient is positive in the gas plenum region 26 is L=Lv−Ls=40−5.3=34.7 cm.

Thus, in the present example, in particular, it is possible to reduce the void reactivity, further improve the safety, and eliminate the possibility of damage to the cladding tube 2 while achieving compactness by disposing the region (Ls) for absorbing fuel swelling and forming the small-diameter portion 12 having a length of L.

Figure 3:
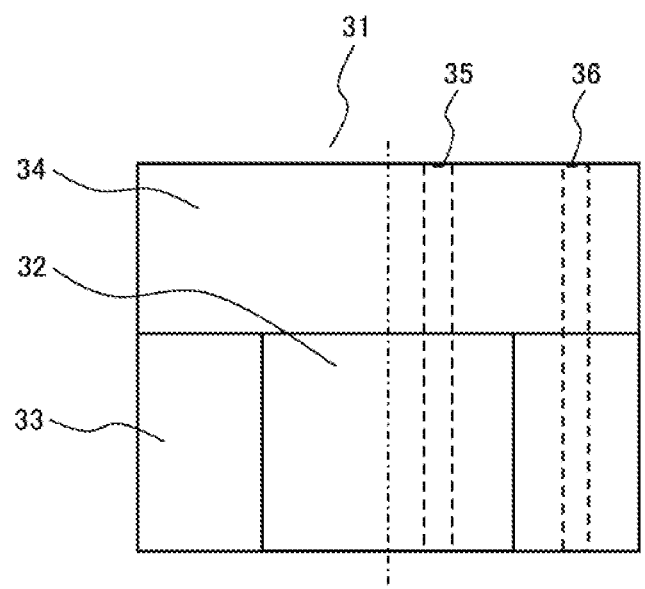
FIG. 3 is an explanatory view illustrating a vertical cross-section of a core of the metal fuel fast reactor of Example 1.

FIG. 3 is an explanatory view illustrating a vertical cross-section of the core of the metal fuel fast reactor of Example 1.

A core 31 described in the present example is a so-called homogeneous core in which the Pu enrichment of an inner core fuel assembly 35 disposed in an inner core fuel region 32 is made lower than the Pu enrichment of an outer core fuel assembly 36 disposed in an outer core fuel region 33, and the radial power distribution of the core 31 is flattened.

That is, the core 31 described in the present example includes an inner core fuel region 32 loaded with the inner core fuel assembly 35 having a low Pu content of metal fuel, the outer core fuel region 33 loaded with the outer core fuel assembly 36 having a high Pu content of metal fuel, and a gas plenum region 34 located above these regions. These fuel assemblies are illustrated in FIG. 1B.

Figure 4:
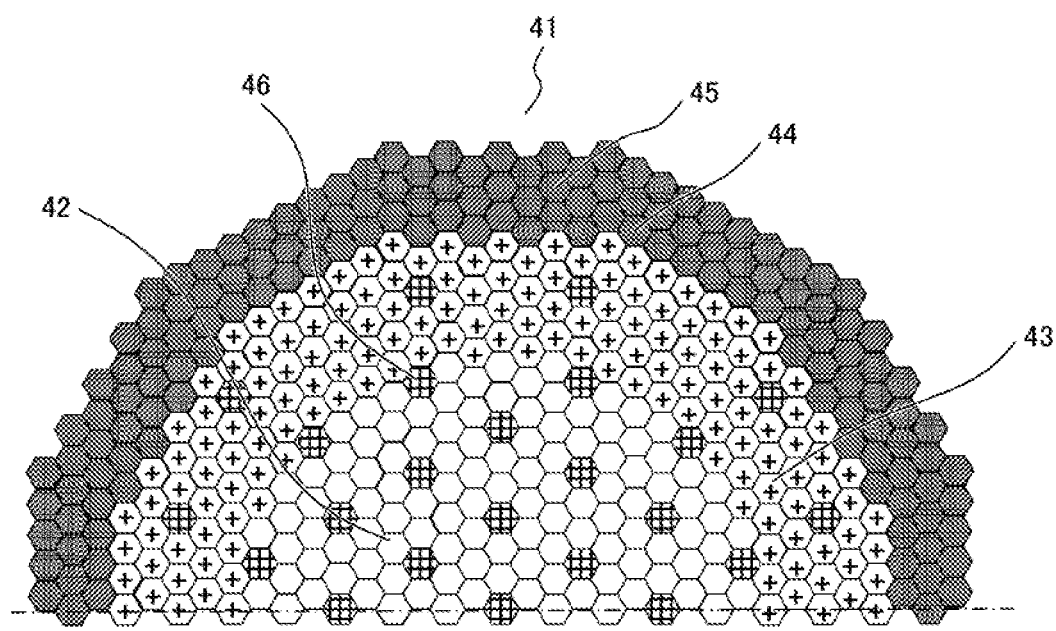
FIG. 4 is an explanatory view illustrating a horizontal cross-section of a core 1/2 region of the metal fuel fast reactor of Example 1.

FIG. 4 is an explanatory view illustrating a horizontal cross-section of a core 1/2 region of the metal fuel fast reactor of Example 1.

The core 41 described in the present example includes an inner core fuel region 42, an outer core fuel region 43 surrounding the inner core fuel region 42, a radial blanket assembly region 44 disposed as one layer on the outer peripheral side of the outer core fuel region 43, and a two-layer radial shield assembly region 45 surrounding the radial blanket assembly region 44. A control rod assembly 46 is disposed in these core regions.

Thus, according to the present example, it is possible to provide a fuel element, a fuel assembly, and a core that can reduce pressure loss and reduce void reactivity while achieving compactness, in particular, further improve the safety against the ULOF, and eliminate the possibility of damage to the cladding tube 2 and improve economic efficiency.

Example 2

Figure 5:
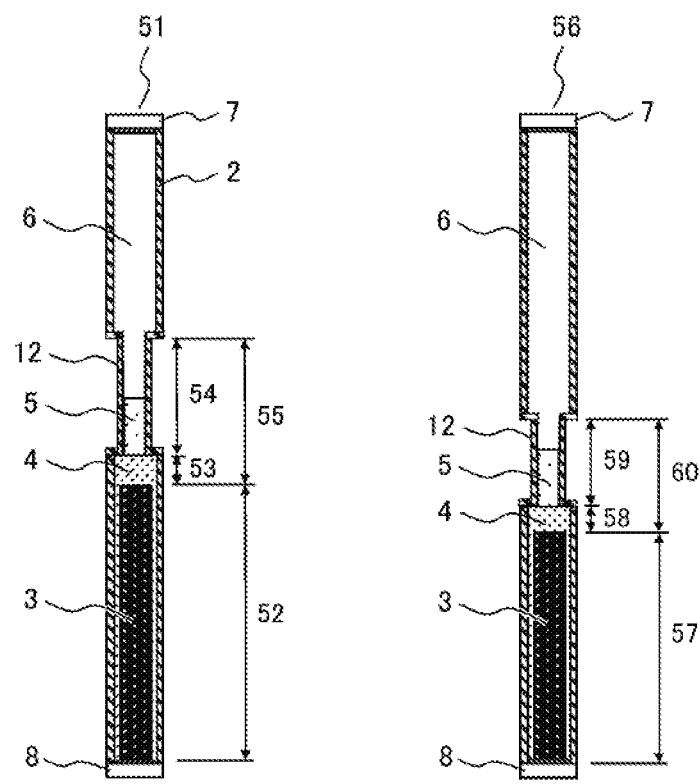
FIG. 5 is an explanatory view illustrating a vertical cross-section of a fuel element of an outer core and an inner core of a metal fuel fast reactor of Example 2.

FIG. 5 is an explanatory view illustrating a vertical cross-section of a fuel element of an outer core and an inner core of the metal fuel fast reactor of Example 2.

The core described in the present example is a so-called homogeneous core in which the Pu content of the fuel element 51 used in the outer core fuel assembly is higher than the Pu content of the fuel element 56 used in the inner core fuel assembly, the outer core fuel region loaded with the outer core fuel assembly is disposed radially outside the inner core fuel region loaded with the inner core fuel assembly, and the metal fuel 3 is a ternary alloy of U—Pu—Zr.

The core described in the present example is characterized in that an effective fuel length (core height) 57 of the fuel element 56 in the inner core fuel assembly 42 (see FIG. 4) is shorter than an effective fuel length (core height) 52 of the fuel element 51 in the outer core fuel assembly 43 (see FIG. 4). This is because the inner core fuel assemblies 42 contribute more to the void reactivity than the outer core fuel assemblies 43.

Here, since the cores of two kinds of fuel elements (fuel assemblies) having different effective fuel lengths (lengths in the vertical direction of the metal fuel 3) Lf are used, the specification of the fuel element based on the difference in the effective fuel lengths is studied.

As illustrated in Equation (1), when an average discharge fuel burnup E is the same, if the effective fuel length Lf is reduced, the length Ls in the vertical direction of the region that absorbs the fuel swelling (the length in the vertical direction of the region that absorbs the metal fuel 3 expanded by the axial swelling) can be reduced. On the other hand, when the effective fuel length Lf is reduced, the rate of neutron leakage from the reactor core to the axial direction is increased, and therefore the void reactivity decreases, and the length Lv in the vertical direction of the region where the coolant density reactivity coefficient is positive increases.

Here, assuming that the neutron flux is $\phi$ (1/cm²·s) and the geometrical buckling is $Bg^2$, the amount of neutron leakage from the reactor core is proportional to $\phi \times Bg^2$. Considering the amount of neutron leakage from the reactor core to the axial direction (one-dimensional direction), $Bg^2$ is expressed by Equation (2).

$$Bg^2 = (\pi/Lf)^2 \qquad (2)$$

When the effective fuel length (core height) Lf is 100 cm, the length Lv at which the amount of neutron leakage significantly affects the coolant density reactivity coefficient is 40 cm. As described above, the amount of neutron leakage is proportional to the buckling $Bg^2$ and inversely proportional to the square of the effective fuel length (core height) Lf.

In the case of the effective fuel length (core height) Lf, the length Lv in the vertical direction of the region where the coolant density reactivity coefficient is positive is expressed by Expression (3).

$$Lv = (100/Lf)^2 \times Lf \times 40/100 \qquad (3)$$

The term $(100/Lf)^2$ is a term that specifies the amount of neutron leakage, and the term $Lf \times 40/100$ is a term that specifies that the proportion is obtained when Lf is approximately 100 cm and Lv is approximately 40 cm.

According to Equations (1) and (3), with respect to the core height and the average discharge fuel burnup, Lv (length in the vertical direction of the region where the coolant density reactivity coefficient is positive (length of the region where the gas plenum region has a large contribution to the void reactivity)), Ls (length in the vertical direction of the region that absorbs fuel swelling), L (length in the vertical direction of the region where the diameter of the gas plenum 6 is reduced) are determined.

Table (1) shows the length in the vertical direction of each region of the fuel element of the present example with respect to the core height and the average discharge fuel burnup for three representative cases.

TABLE 1

| Case Name | Lf (cm) | E (GWd/t) | Lv (cm) | Ls (cm) | L (cm) |
|---|---|---|---|---|---|
| 1 | 100 | 150 | 40 | 8.0 | 32.0 |
| 2 | 100 | 100 | 40 | 5.3 | 34.7 |
| 3 | 80 | 100 | 50 | 4.3 | 45.7 |

The length in the vertical direction of each region of the fuel element of the present example with respect to the core height and the average discharge fuel burnup The core described in the present example includes a fuel element 51 used in the outer core fuel assembly and a fuel element 56 used in the inner core fuel assembly.

The core height (effective fuel length) 52 (Lf) of the fuel element 51 is 100 cm, the core height (effective fuel length) 57 (Lf) of the fuel element 56 is 80 cm, the fuel element 51 corresponds to Case 3 in Table (1), and the fuel element 56 corresponds to Case 2 in Table (1).

Therefore, the length in the vertical direction of each region of the fuel element 51 is Lv (55) 40 cm, Ls (53) 5.3 cm, L(54) 34.7 cm, and the length in the vertical direction of each region of the fuel element 56 is Lv (60) 50 cm, Ls(58) 4.3 cm, L(59) 45.7 cm.

In the present example, the average discharge fuel burnup E is constant.

Lf51 is the core height of the fuel element 51 used in the outer core fuel assembly, Lv51 is the length in the vertical direction of the fuel element 51 in the region where the coolant density reactivity coefficient is positive, Ls51 is the length in the vertical direction of the region that absorbs the fuel swelling of the fuel element 51, and L51 is the length in the vertical direction of the region where the diameter of the gas plenum 6 of the fuel element 51 is reduced.

Lf56 is the core height of the fuel element 56 used in the inner core fuel assembly, Lv56 is the length in the vertical direction of the region where the coolant density reactivity coefficient of the fuel element 56 is positive, Ls56 is the length in the vertical direction of the region that absorbs the fuel swelling of the fuel element 56, and L56 is the length in the vertical direction of the region where the diameter of the gas plenum 6 of the fuel element 56 is reduced.

In this case, Lf51>Lf56, Ls51>Ls56, Lv56>Lv51, and L56>L51.

Further, the length of the gas plenum region 26 excluding a part (the region where the small-diameter portion 12 is formed) of the gas plenum region 26 of the fuel element 51 used in the outer core fuel assembly is denoted by A516.

Further, the length of the gas plenum region 26 excluding a part (the region where the small-diameter portion 12 is formed) of the gas plenum region 26 of the fuel element 56 used in the inner core fuel assembly is denoted by A566.

In this case, A516<A566.

In particular, the core described in the present example is characterized in that the length 54 (L51) in the vertical direction of the gas plenum region (the region where the small-diameter portion 12 is formed) which is smaller than the diameter of the cladding tube 2 in the region where the metal fuel 3 is disposed in the fuel element 51 used in the outer core fuel assembly is shorter than the length 59 (L56) in the vertical direction of the gas plenum region (the region where the small-diameter portion 12 is formed) which is smaller than the diameter of the cladding tube 2 in the region where the metal fuel 3 is disposed in the fuel element 56 used in the inner core fuel assembly.

Figure 6:
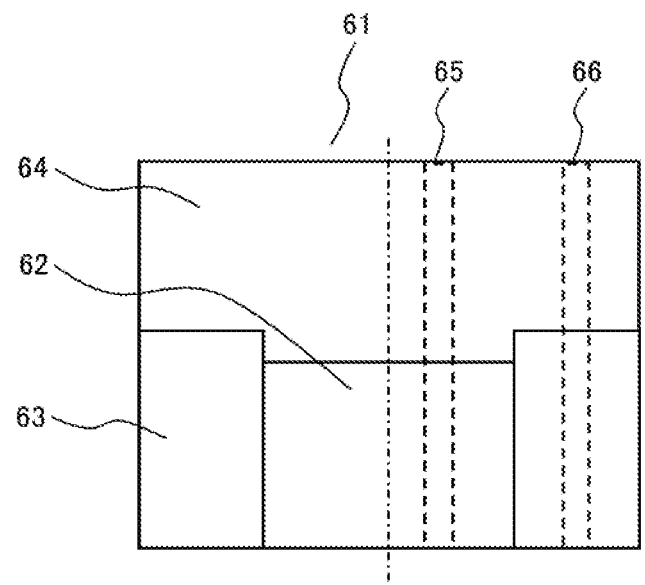
FIG. 6 is an explanatory view illustrating a vertical cross-section of a core of the metal fuel fast reactor of Example 2.

FIG. 6 is an explanatory view illustrating a vertical cross-section of the core of the metal fuel fast reactor of Example 2.

A core 61 described in the present embodiment includes an inner core fuel assembly 65 having a low core height disposed in an inner core fuel region 62 and an outer core fuel assembly 66 having a high core height disposed in an outer core fuel region 63.

That is, the core 61 described in the present example includes the inner core fuel region 62 loaded with an inner core fuel assembly 65 having a low core height, the outer core fuel region 63 loaded with an outer core fuel assembly 66 having a high core height, and a gas plenum region 64 located above these regions.

As described above, the core described in the present example is characterized in that the effective fuel length (core height) 57 of the fuel element 56 is shorter than the effective fuel length (core height) 52 of the fuel element 51. This is because the inner core fuel assemblies 42 contribute more to the void reactivity than the outer core fuel assemblies 43.

According to the present example, the pressure loss is reduced and void reactivity is further reduced while achieving compactness. In particular, it is possible to provide a fuel element, a fuel assembly, and a core that can further improve the safety against the ULOF, and eliminate the possibility of damage to the cladding tube 2 and improve economic efficiency.

In Examples 1 and 2, a ternary alloy of uranium, plutonium, and zirconium is used as the metal fuel 3, but alloys of uranium, transuranium elements (TRU), and zirconium may be used. As for uranium, depleted uranium or enriched uranium may be used. Further, although sodium is used as the coolant material, water, lead, lead bismuth, molten salt, or the like may be used.

The present example is not limited to the above-described example, but includes various modification examples. For example, the above-described examples have been described in detail for easy understanding of the present invention, and are not necessarily limited to those having all the configurations described. Further, a part of the configuration of one example can be replaced with a part of another configuration, and the configuration of another example can be added to the configuration of one example.

What is claimed is:

1. A Fuel element comprising:
    a cladding tube having upper and lower sections and a middle section having a smaller diameter than the upper and lower sections;
    a gas plenum region in the upper section and an upper portion of the middle section;
    a metal fuel contained in the lower section;
    a fuel swelling absorption region in the lower section above the metal fuel; and
    a coolant disposed between sides of the metal fuel and the cladding tube in the lower section, in the fuel swelling absorption region, and in a lower portion of the middle section, wherein
    a coolant density reactivity coefficient in the lower section has a negative value, and
    a coolant density reactivity coefficient in the upper portion of the middle section has a positive value.

2. The fuel element according to claim 1, wherein a length in a vertical direction of the upper portion of the middle section having the positive value of the coolant density reactivity coefficient is $(100/Lf)^2 \times Lf \times 40/100$ where Lf is an effective fuel length of the metal fuel.

3. A fuel assembly comprising:
    a plurality of fuel elements;
    a wrapper tube surrounding the plurality of fuel elements;
    a coolant material passage formed between the plurality of fuel elements; each fuel element of the plurality of fuel elements including:
    a cladding tube having upper and lower sections and a middle section having a smaller diameter than the upper and lower sections, a gas plenum region in the upper section and an upper portion of the middle section, a metal fuel contained in the lower section, a fuel swelling absorption region in the lower section above the metal fuel, and a coolant disposed between sides of the metal fuel and the cladding tube in the lower section, in the fuel swelling absorption regions, and in a lower portion of the middle section, wherein a coolant density reactivity coefficient in the lower section has a negative value, and a coolant density reactivity coefficient in the upper portion of the middle section has a positive value.

4. A core comprising: an inner core fuel region loaded with the fuel assembly according to claim 3; and an outer core fuel region loaded with the fuel assembly according to claim 3.

5. A core comprising: a plurality of fuel elements, each including a cladding tube having upper and lower sections and a middle section having a smaller diameter than the upper and lower sections, a gas plenum region in the upper section and an upper portion of the middle section, a metal fuel contained in the lower section, a fuel swelling absorption region in the lower section above the metal fuel, and a coolant disposed between sides of the metal fuel and the cladding tube in the lower section, in the fuel swelling absorption regions, and in a lower portion of the middle section; wherein a coolant density reactivity coefficient in the lower section has a negative value, and a coolant density reactivity coefficient in the upper portion of the middle section has a positive value, the plurality of fuel elements is divided between an outer core fuel assembly and an inner core fuel assembly;

the metal fuel is a ternary alloy of U—Pu—Zr, and a Pu content of the metal fuel in the fuel elements of the outer core fuel assembly is higher than a Pu content of the metal fuel in the fuel elements of the inner core fuel assembly.

6. The core according to claim 5, wherein an effective fuel length of the fuel elements in the inner core fuel assembly is shorter than an effective fuel length of the fuel elements in the outer core fuel assembly.

7. The core according to claim 5, wherein a length in a vertical direction of the middle section of the fuel elements in the outer core fuel assembly is shorter than a length in the vertical direction of the middle section of the fuel elements in the inner core fuel assembly.

\* \* \* \* \*